United States Patent
Bousquet et al.

(10) Patent No.: US 10,102,468 B2
(45) Date of Patent: Oct. 16, 2018

(54) METHOD FOR PRODUCING A RADIO-FREQUENCY DEVICE MAINTAINING ANISOTROPIC CONNECTION

(71) Applicant: GEMALTO SA, Meudon (FR)

(72) Inventors: Christophe Bousquet, La Ciotat (FR); Yves Cuny, La Ciotat (FR); Brigitte Lacaze, La Ciotat (FR); Antoine Bajolle, La Ciotat (FR); Sébastien Gaspari, La Ciotat (FR); Frédérick Seban, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/896,159

(22) PCT Filed: Jun. 2, 2014

(86) PCT No.: PCT/EP2014/061403
§ 371 (c)(1),
(2) Date: Dec. 4, 2015

(87) PCT Pub. No.: WO2014/195273
PCT Pub. Date: Dec. 11, 2014

(65) Prior Publication Data
US 2016/0140431 A1    May 19, 2016

(30) Foreign Application Priority Data

Jun. 7, 2013 (EP) ..................... 13305765

(51) Int. Cl.
*G06K 19/06* (2006.01)
*G06K 19/077* (2006.01)

(52) U.S. Cl.
CPC ..... *G06K 19/07728* (2013.01); *G06K 19/077* (2013.01); *G06K 19/0775* (2013.01); *G06K 19/07722* (2013.01); *G06K 19/07769* (2013.01)

(58) Field of Classification Search
CPC ....... G06K 19/07745; G06K 19/07747; G06K 19/07749; G06K 19/0775
(Continued)

(56) References Cited

U.S. PATENT DOCUMENTS 5,598,032 A    1/1997 Fidalgo
6,288,905 B1 * 9/2001 Chung ..................... B32B 3/08
                                                   174/256

(Continued)

FOREIGN PATENT DOCUMENTS

FR    2 861 201 A1    4/2005

OTHER PUBLICATIONS

International Search Report (PCT/ISA/210) dated Sep. 29, 2014, by the European Patent Office as the International Searching Authority for International Application No. PCT/EP2014/061403.
(Continued)

*Primary Examiner* — Thien M Le
*Assistant Examiner* — April Taylor
(74) *Attorney, Agent, or Firm* — Buchanan Ingersoll & Rooney PC

(57) ABSTRACT

The invention relates to a method for producing an intermediate device comprising an electronic module, said intermediate device being used to receive at least one film or portion of a film or covering layer, said device comprising: a supporting body; at least one area for the interconnection of an electric circuit, borne by the supporting body; and an electronic module connected to said interconnection area by an anisotropic connection material, said material being com-
(Continued)

pressed between said area and the module. The method comprises the implementation of a means for maintaining the compressed state of said anisotropic material and/or a means for isolating said material from the outside of the supporting body.

20 Claims, 3 Drawing Sheets

(58) Field of Classification Search
USPC .................................. 235/487, 488, 492
See application file for complete search history.

(56) References Cited

U.S. PATENT DOCUMENTS

| | | | |
|---|---|---|---|
| 7,735,741 B2* | 6/2010 | Launay | G06K 19/07745 |
| | | | 235/487 |
| 7,777,317 B2* | 8/2010 | Wolny | G06K 19/07749 |
| | | | 257/679 |
| 9,041,199 B2* | 5/2015 | Murai | H01L 21/563 |
| | | | 257/737 |
| 9,167,691 B2* | 10/2015 | Vogt | H05K 1/112 |
| 9,367,791 B2* | 6/2016 | Launay | G06K 19/025 |
| 2006/0255157 A1 | 11/2006 | Launay et al. | |
| 2010/0243743 A1* | 9/2010 | Takeuchi | G06K 19/07728 |
| | | | 235/488 |

OTHER PUBLICATIONS

Written Opinion (PCT/ISA/237) dated Sep. 29, 2014, by the European Patent Office as the International Searching Authority for International Application No. PCT/EP2014/061403.

* cited by examiner

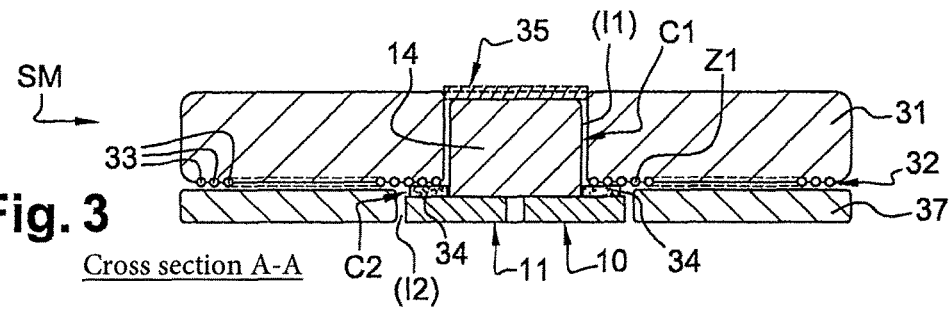
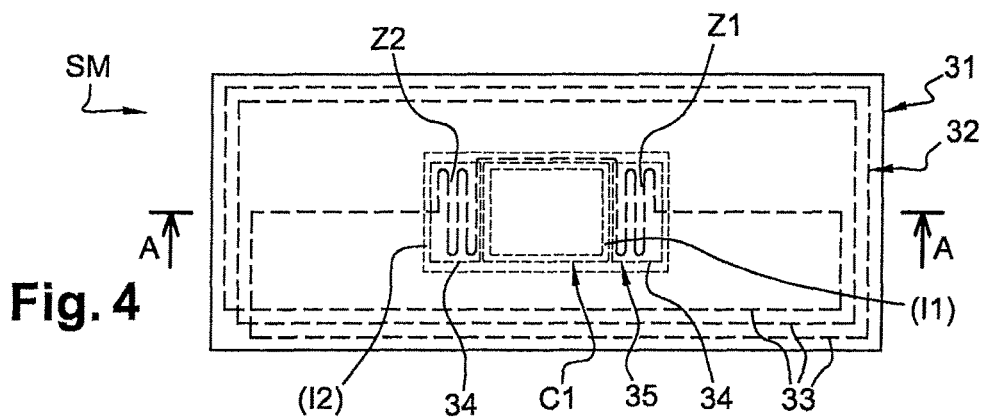
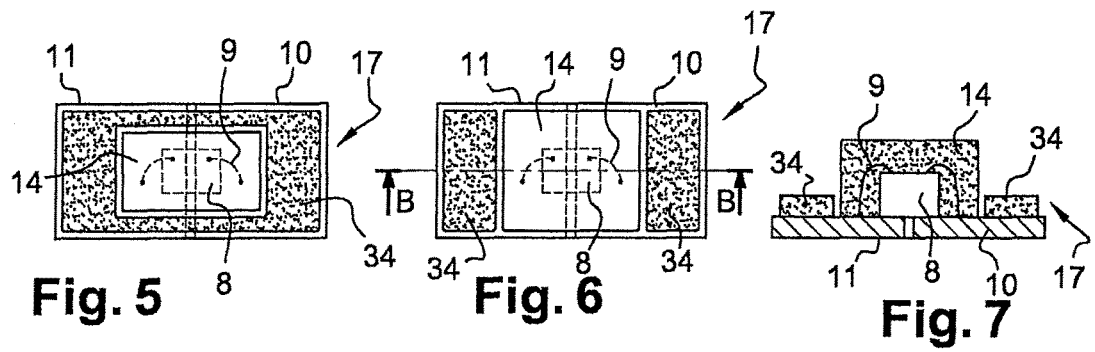
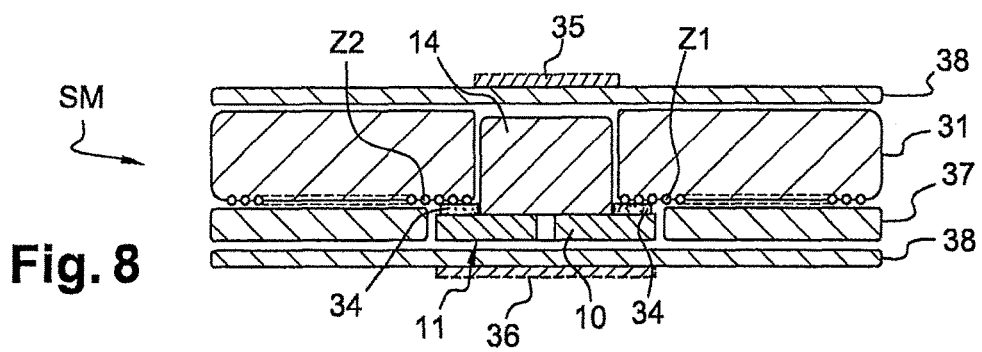

METHOD FOR PRODUCING A RADIO-FREQUENCY DEVICE MAINTAINING ANISOTROPIC CONNECTION

FIELD OF THE INVENTION

The invention concerns a method for manufacturing a semi-finished (intermediate) and final device, comprising in particular a carrier body that integrates connection areas of an electrical/electronic circuit.

More particularly, the invention relates to such devices comprising a radio-frequency antenna connected to a radio-frequency electronic module (or chip) with a connection material such as ACF or ACP (conductive film or anisotropic conductive paste).

The invention relates in particular to the field of radio-frequency electronic supports or devices such a radio-frequency chip cards or hybrid cards, radio-frequency tickets or labels, electronic passports, radio-frequency transponders, and inserts (or inlays) integrating or constituting such supports.

These electronic carriers find an application in various chip-card fields, in particular for banking (EMV), identity, security, authentication, access, loyalty and passport applications.

Such electronic carriers may be in accordance in particular with the ISO/IEC 14443 standard or other radio-frequency standard, in particular NFC (Near Field Communication).

An electronic module may constitute or comprise conductive connection or interconnection pads carried or not, according to circumstances, by an insulating substrate.

PRIOR ART

The U.S. Pat. No. 5,598,032 describes a method for assembling a module intended to be connected to an antenna embedded in a hybrid chip card carrier body (of the contact and contactless type). Providing a cavity in the carrier body so as to make the connection areas of the antenna accessible for connection with the module when it is transferred into the cavity is known. Conductive interconnection elements of all kinds may connect connection pads of the module disposed outside the coating and the connection areas of the antenna.

Moreover, a dual-interface card (with contact and contactless) of the above type has been offered on the market, with an antenna made from metal etched on a substrate and then included in a card body; the connection between a module with external contacts provided with interconnection terminals under the module and the connection ends of the antenna is achieved by a sheet of ACF disposed between them. A plurality of interconnections (2 or 3) are necessary at various points distributed around the module in order to connect each end of the antenna. This increase in interconnections with the antenna makes it possible to guarantee, to a certain extent, electrical connection between the module and the antenna during bending/twisting forces on the card.

The anisotropic material comprises, in a known version, a thermoadhesive base with conductive microballs embedded therein. The film is conductive at a point perpendicular to the film when the film is compressed at this point and the balls are brought closer together in order to form an electrical conduction area between two conductive surfaces to be interconnected.

During twisting/bending, the balls may move away from one another and lose the electrical conduction that they had previously between them.

The patent application FR 2 861 201 describes a method for manufacturing a double-interface finished card. A module with external electrical contacts is inserted in a cavity in the finished card body and is connected to connection pads of an antenna by anisotropic adhesive. The module comprises a chip coated with an insulating resin that holds the module at the bottom of the cavity by virtue of its high shrinkage capacity during its hardening in order to ensure a good electrical connection of the module to the antenna. For embedding the module in the cavity, clearance is necessary between the edges of the module and the walls of the cavity.

Technical Problem

During an examination of this type of card with a dual (hybrid) interface provided with an ACF film as above, the inventors discovered the following drawbacks. After a certain length of storage time, hybrid cards with ACF have operating defects.

Furthermore, layers of fragile material, used as a cover in chip card bodies, may be damaged by cracks that arise and propagate in the region of the module.

Moreover current assemblies (soldering, thermocompression) of a module in a card body may give rise to distortions of the chip carrier (lead frame) adding addition stresses to the module that may be visible on the surface of the card body.

SUMMARY OF THE INVENTION

At the origin of the invention, the inventors discovered that the electrical connection between the module and the circuit was no longer taking place, or badly. They found an unexpected swelling in the ACF film causing a rupture in the connection between the circuit and the module. The cause of this swelling reaction was revealed by the invention and would be explained by a reaction to moisture and/or saline atmosphere of the anisotropic material exposed to the outside.

The invention relates to a method for manufacturing an intermediate device with electronic module, said intermediate device being intended to receive at least one sheet or portion of a sheet or cover layer of a device comprising a module interconnected by ACF to a circuit (in particular an antenna) and having, in one of its intermediate (or semi-finished) configurations, the ACF exposed or emerging to the outside. The invention provides a first means for avoiding the problem of swelling and/or maintaining compression on the conductive material (in the direction of the connection generally perpendicular to the card body) in order to ensure connection of the module to the circuit. This means, in a preferred mode, may comprise at least one covering sheet and/or protective material insulating the ACF from the outside.

To this end, the subject matter of the invention is a method for manufacturing an intermediate device with electronic module, said intermediate device being intended to receive at least one covering sheet or portion of sheet or layer, said method comprising a step of forming a carrier body comprising at least one interconnection area (Z1, Z2) of an electrical circuit, carried by the carrier body, an electronic module connected to said interconnection area by an anisotropic connection material, said material being compressed between said area and the module.

The method is characterised in that it comprises the use of means for maintaining the compressed state of said anisotropic material and/or means for isolating said material from the outside of the carrier body.

According to other features or embodiments:

said maintenance or isolation means at least partly covers said module (17) and is fixed to the carrier body (31, 32);

said maintenance and/or isolation means is substantially stable under or impervious to moisture;

the maintenance and/or isolation means may comprise a layer or sheet straddling the module and the support body;

in the case of a layer or sheet that is more elastic or more flexible compared with the covering sheets, the maintenance and/or isolation means also has the advantage of absorbing movements of the module during bending/twisting of the device or of mechanically decoupling the covering sheets from the module so as to prevent generation or propagation of cracks;

the layer or sheet may extend over the entire surface of the carrier body;

the circuit is chosen from an antenna, a display unit, a sensor, a keypad, a switch, an electrical/electronic component, etc;

the circuit in the form of an antenna may comprise a coated conductive wire;

the contact area may comprise alternations of wire;

the module may comprise a side emerging on each of the opposite faces of the carrier body and the maintenance means fixes the module by each of its sides to the carrier body; in particular, the maintenance means may comprise two layers or sheets (in particular adherent) covering the module and fixed to the carrier body.

Another subject matter of the invention is a device corresponding to the method constituting or comprising the module.

BRIEF DESCRIPTION OF THE FIGURES

FIGS. 3 and 4 illustrate a step of a first embodiment of the invention respectively in plan view and in cross section A-A in FIG. 4;

FIGS. 5 and 6 illustrate a module that can be used by the invention with two different distributions of the anisotropic glue;

FIG. 7 illustrates a cross section along B-B in FIG. 6;

FIG. 8 illustrates a step subsequent to the step illustrated in FIGS. 3 and 4;

DESCRIPTION

Figure 1:
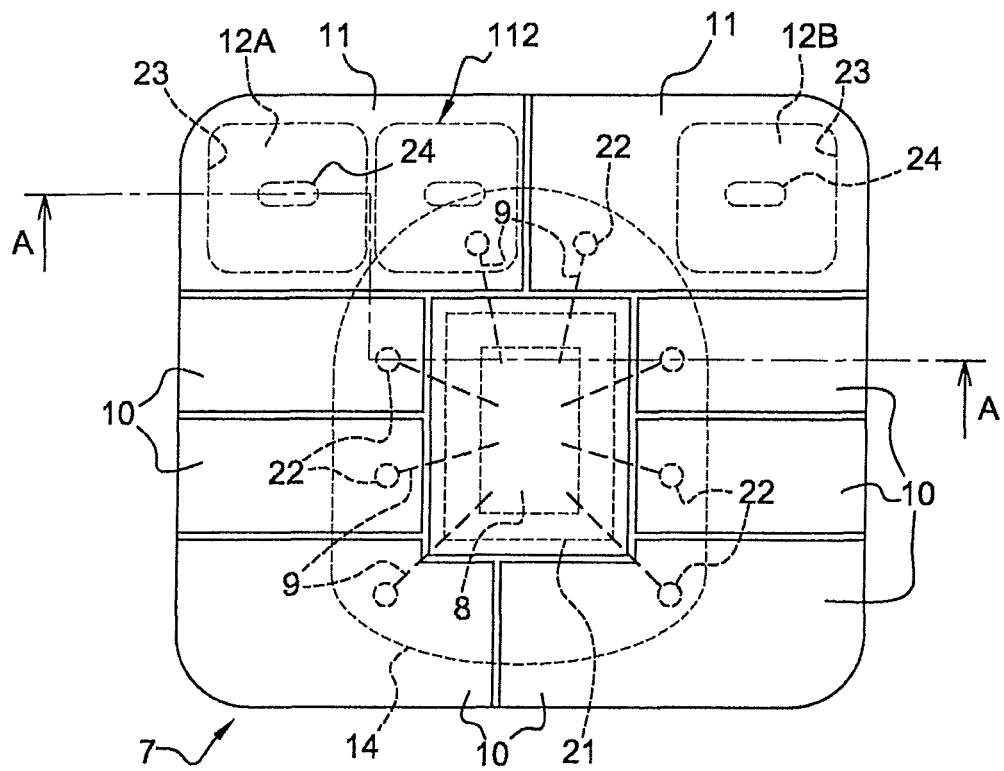
FIGS. 1 and 2 illustrate an example of a chip card module of a hybrid integrated circuit of the prior art.
Figure 2:
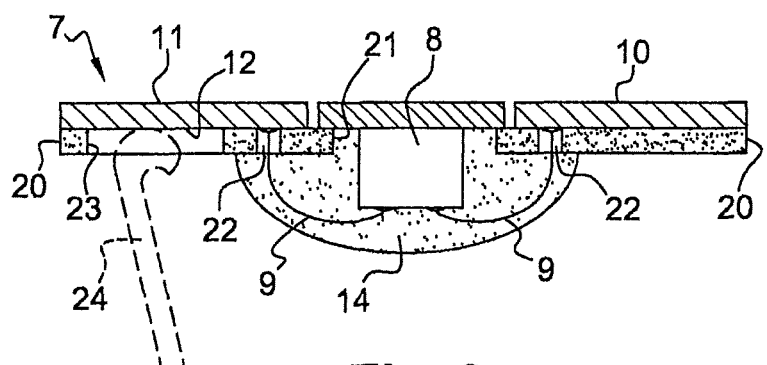

FIGS. 1 and 2 illustrate an example of a chip-card module 7 of a hybrid integrated circuit of the prior art. The module 7 comprises contact pads 10, 11 on a dielectric or insulating carrier 20, in particular of the laminated lead frame type, at least one integrated circuit chip 8 attached to the carrier 20 or here to a contact or contactless metal pad. The contact pads are intended to connect a chip card reader connector.

The module also comprises connections 9 for in particular connecting contact pads by soldered wires, by conductive glue or other, an electronic chip 8 (here of the hybrid type) being able to be turned over (flip-chip) or not; it comprises a coating 14 on the chip and/or its connections by means of a protective material such as a resin (glob-top).

The connections 9 may connect the contact pads through orifices 22 formed in the insulating support.

FIGS. 3 and 4 illustrate a step of a first embodiment of a method for manufacturing an electronic device according to the invention respectively in plan view and in cross section A-A in FIG. 4.

The device comprises a carrier body 31, at least one interconnection area Z1, Z2 of an electrical and/or electronic circuit 32, carried by the carrier body, an electronic module 17 connected to said interconnection area by an anisotropic connection matter or material 34, the matter (or material) being compressed between said area Z1, Z2 and the module 17.

In the example, the device is a purely contactless (radio-frequency) card having as an electrical circuit a radio-frequency antenna 32 connected to a radio-frequency module 17. However, the device may alternatively be an electronic passport, a radio-frequency (or NFC) key, a printed circuit, a radio-frequency reader, an RFID label, any electronic object or a multi-component device.

The electrical and/or electronic circuit may be chosen from or comprise in particular an antenna, a coil, a display unit, a sensor, a keypad, a capacitor, a switch, an electrical and/or electronic component, an energy-supply battery, or a printed circuit (PCB).

The antenna 32 is composed here of turns 33, formed on a substrate or carrier body 31, by any known means, in particular by screen printing, conductive material jet, electrodeposition technique, or etching. The antenna is here made from wire coated by ultrasonic technique on the principal surface of the substrate 31, which is in particular made from known plastics material (ABS, PC, PET) or fibrous material. For other radio-frequency frequencies (in particular UHF), the antenna may have a form different from flat turns. The contact pads or interconnection areas of the antenna are formed by zigzags (or close-together alternations) of conductive wires. The invention also applies to metal pads in particular rectangular in shape, for example made from copper or tin (tin-plated or not).

The antenna comprises contact or interconnection areas Z1, Z2 spaced apart by a distance corresponding to the interconnection pads or areas of the radio-frequency module (or connection pins of the chip in the case of a module consisting of an electronic chip).

In the case where, as in the example, the pads consist of conductive wires covered with insulator, the latter may be omitted at the point of the connection by any known means, in particular mechanical, machining or by laser, or chemical or thermal attacks.

The substrate or carrier body 31 is assembled here with a compensation sheet 37 covering the antenna. Alternatively, it is the other sheet 31 that forms a compensation sheet. This thickness compensation sheet 37 comprises a perforation of cavity C2 centred on a perforation or cavity C1 in the substrate 31 separating the contact pads of the antenna.

Alternatively, the substrate (or carrier body) may not have a cavity and receive a circuit and module or chip on the surface of the sheet (for example the case of an RFID label or NFC transponder). The carrier body may also be produced by moulding and the cavity obtained by moulding with the core or machining.

The electronic module (17) or (14, 10, 11) comprises, in the example, two contact or connection pads 10, 11 (without dielectric support) connected to the chip 8 by a connection, in particular wired, 9, a coating 14 as before. Alternatively, the chip may be mounted as flip-chip (turned over) and without protective coating.

Then an anisotropic conductive matter or material 34 is placed between the pads of the antenna and those of the module (or pins of the chip) before effecting the connection by transfer of the module. It is possible to use a material in the form of a film (ACF) or paste (ACP).

They are distributed for example by the company Sony under the references FP2622A, FP2322D, FP2322A, FP2322US in ACF and BP533E, BPS0034A1 in ACP. They are also distributed by the company Tesa under the references HAF 8412 and HAF 8414 in ACF or by the company 3M under the references 5363, 7376, 7378, 7371, 5379 in ACF.

According to one advantage of the invention, the conductive material may have the property of being more flexible than the covering sheets 38 at the temperature of use of the electronic product (in particular between −15° and 60° C.

In FIGS. 5, 6, 7, the conductive material 34 (adhesive or thermoadhesive) may be disposed or laminated on the connection areas 10, 11 of the module (or chip). In FIGS. 6 and 7, the material is disposed on each contact (or connection) pad.

In FIG. 5, the material 34 has an annular form in order to surround the coating 14.

The thickness of the anisotropic conductor material may be calculated to allow flow of the material into the gaps surrounding the module after assembly with the body of the product or on the contrary not to flow excessively (for example in the case where it is wished to fill the gaps with another material or a maintenance means as explained below).

Where applicable, in order in particular to allow ejection of air trapped under a covering sheet or layer, the device may comprise one or more openings in the covering layer or sheet.

Then, during another step, the module 17 is transferred against the antenna, pressed and heated at least on this connection area in order to establish the connection with the connection areas Z1, Z2 of the antenna and optionally a flow of material into the gaps surrounding the module and situated at the interface between the module and the carrier body.

Alternatively, the conductive material 34 may be applied directly to the connection areas of the antenna Z1, Z2; then the module (or chip) is transferred against the antenna, pressed and heated at least on this contact area.

The connection takes place by compression of the material between the interconnection areas Z1, Z2 and the connection pads 10, 11 of the module. The connection may be made by transferring the module with the insertion tool exerting pressure and heating. Where applicable, the connection takes place by lamination or pressing of the whole (module, carrier body, connection material) between two heated rollers or press plates.

According to one feature of this embodiment or implementation, the method makes provision for providing the device with a means of maintaining the compressed state of the anisotropic matter 34. This maintenance means at least partly covers the module and is fixed to the carrier body.

In the example, in FIG. 8, these means comprise at least one definitive or temporary covering sheet (insofar as other covering sheets or layers may come to complete the device).

The maintenance means is substantially stable in or impervious to moisture. In the example, the sheets used are made from PVC, PET, PETg or PC (polycarbonate).

A semifinished device SM (inlay or insert) is here obtained by hot lamination. The gaps I1, I2 existing between the module and the carrier body and substantially perpendicular to the surface of the carrier body may also be filled with the material of the covering sheets 38.

The operation of connecting the module to the antenna and the operation of at least partial filling in of the gaps or slot surrounding the module may advantageously take place by hot lamination of the whole.

Moreover, the gap I1 at the rear of the module may, where applicable, also be filled in with an elastic or flexible rear patch 35 that has also flowed therein.

The rear surface of the coating may also comprise the elastic material 35 absorbing compressions of the module towards the rear surface of the substrate (occurring in particular during bending/twisting of the final device.

Figure 9:
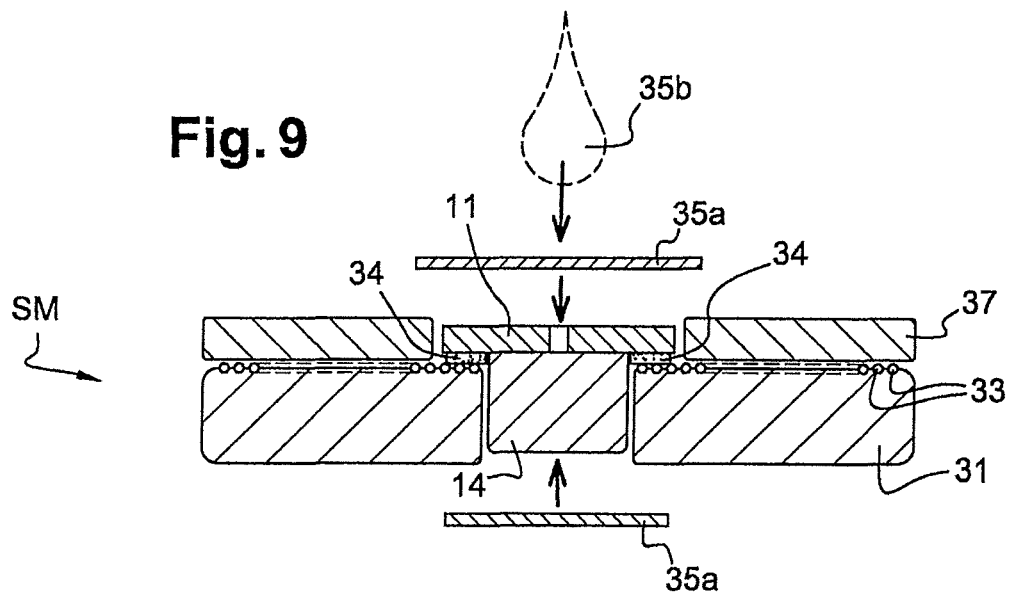
FIGS. 9 and 10 illustrate second and third embodiments of the invention.
Figure 10:
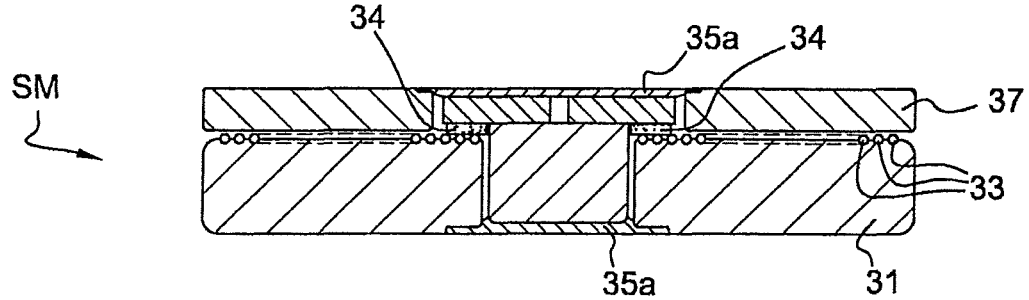

In FIGS. 9 and 10, the invention provides for a construction similar to the previous figure but with substantially different maintenance means.

The covering sheets 38 are replaced by sheet portions 35a that extend here entirely over the module and partially over the carrier body.

In FIG. 10 after hot lamination, the connection is made and the portions of sheets or layers 35a correctly fill in any differences in level between the module and the surface of the carrier body. The external surfaces of the device are flat following the lamination and ready, applicable, to accept other surface elements or other covering sheets.

This device has the advantage of being able to be stored as it is, without risks of damage to the connections, as temporary inlay or insert. This temporary device may be taken up in order to be packaged in a definitive form, in particular as a radiofrequency chip, banking or identity card, badge or passport, with other finishing or graphical treatment sheets, varnish, etc.

Thus the anisotropic material is kept compressed for good electrical connection of the module to the antenna. Furthermore, the anisotropic material is kept isolated from the external atmosphere and protected against any swelling reaction due to moisture.

The device has the advantage of maintaining each electrical connection even after standardised bending/twisting tests and other applicable standardised tests.

Secondarily also, before hot pressing, it is possible to dispose a patch or piece of hot-melt elastic or flexible material 35 (in broken lines) against the rear of the module, here against the coating 14. This patch may extend substantially over the entire surface of the cavity C1 and the gap I1 between the cavity and the coating 14. It may be intended to absorb stresses that may arise at the interface of the module with the substrate and stop any propagations of cracks to covering sheets covering the substrate 31.

This patch may also make it possible to have the functions of the sheet portions 35a or sheets 38. Where applicable, it may be possible to dispense with a sheet 38 on one or other side of the module exposed to the outside of the carrier body. The patch fills in the gaps around the module.

The maintenance means may take various forms; it may be annular in order to cover a peripheral gap around the module; it may be distributed in the form of one or more drops of insulating material above the module 35b (FIG. 9) or a hot-melt insulating paste.

The dimensions of the conductive film 34 (ACF or electrically conductive paste, ACP) may be adjusted to the contact areas of the antennas and/or of the module. Alternatively, the dimensions of the electrically conductive film may be adjusted to those of the module (or chip).

Pressing is preferably carried out subsequently during lamination of the product once assembled, preferably with covering plates or sheets and other anti-cracking patch or part. Preferably, the assembly takes place on large plates or sheets comprising a plurality of modules and antennas. The substrate 31 may also be in the form of a continuous strip. The final device then being extracted by cutting from the substrate with a plurality of devices.

In FIG. 8, the invention provides a construction similar to FIG. 3, except that the patch 35 is disposed outside a covering sheet covering the substrate 3 on the coating side.

Where applicable, the above embodiment can comprise another elastic hot-melt patch 35 vertically in line with the contact pads of the module or the cavity C2 in the compensation sheet.

In other variants, not shown, the maintenance means may be mechanical such as for example mechanical attachment means. The resin of the module may be in the form of a notch such as a peg or screw pitch. During the connection of the module by compression of the anisotropic material, the notches of the coating become attached to the cavity wall of the carrier body.

Where applicable, the module comprises attachment claws (protrusions on the connection pads that press into the carrier body like a clamp).

Alternatively, deformations or cutouts in the connection pads that press into the connection areas Z1, Z2 like connections of the crimp type in electronic labels are produced with a suitable tool. Thus, by interpenetration, the connection pads of the module can be attached to the connection areas Z1, Z2 in order to maintain a compression of the balls of anisotropic material.

The invention claimed is:

1. A method for manufacturing a contactless, purely radiofrequency intermediate device with a contactless, purely radiofrequency electronic module, said intermediate device being configured to receive at least one covering sheet or portion of sheet or layer, said method comprising a step of forming a carrier body comprising:
    at least one interconnection area of an electrical circuit, carried by the carrier body; and
    the radiofrequency electronic module connected to said at least one interconnection area by an anisotropic connection material, said anisotropic connection material being compressed between said at least one interconnection area and the radiofrequency electronic module, and a portion of the radiofrequency electronic module extending into the carrier body between two portions of the at least one interconnection area,
    wherein the method comprises the use of maintenance/isolation means for maintaining the compressed state of said anisotropic connection material in a compression direction, and for isolating said anisotropic connection material from the outside of the carrier body,
    wherein said maintenance/isolation means overlaps said radiofrequency electronic module and said carrier body as viewed in the compression direction and maintains the compressed state of said anisotropic connection material by pressing against the radiofrequency electronic module in the compression direction, at least a portion of the radiofrequency electronic module being located between the carrier body and the maintenance/isolation means along the compression direction,
    and wherein said maintenance/isolation means completely covers said radiofrequency electronic module as viewed in the compression direction.

2. A method according to claim 1, wherein said maintenance/isolation means is fixed to the carrier body.

3. A method according to claim 2, wherein the maintenance/isolation means is substantially stable in or impervious to moisture.

4. A method according to claim 1, wherein the maintenance/isolation means comprises a layer or sheet at least partly straddling the radiofrequency electronic module and the carrier body.

5. A method according to claim 4, wherein the layer or sheet extends over the entire surface of the carrier body.

6. A method according to claim 1, wherein the electrical circuit is chosen from an antenna, a display unit, a sensor, a keypad, a switch, or an electrical or electronic component.

7. A method according to claim 1, wherein the electrical circuit is in the form of an antenna and comprises a coated conductive wire.

8. A method according to claim 1, wherein the at least one interconnection area comprises alternations of wire.

9. A method according to claim 1, wherein the radiofrequency electronic module is disposed in the carrier body so as to have one side emerging on at least one of the opposite principal faces of the carrier body and the maintenance/isolation means is disposed, comprising a layer or sheet covering the radiofrequency electronic module and being fixed to the carrier body.

10. A method according to claim 9, wherein the method comprises a step of laminating covering sheets or a portion of a covering sheet on the radiofrequency electronic module.

11. A contactless, purely radiofrequency intermediate device with a contactless, purely radiofrequency electronic module, said radiofrequency electronic module being configured to receive at least one sheet or a portion of a sheet or a covering layer on the radiofrequency electronic module, said intermediate device comprising:
    a carrier body,
    at least one interconnection area of an electrical circuit, carried by the carrier body,
    the radiofrequency electronic module connected to said at least one interconnection area by an anisotropic connection material, said anisotropic connection material being compressed between said at least one interconnection area and the radiofrequency electronic module, and a portion of the radiofrequency electronic module extending into the carrier body between two portions of the at least one interconnection area, and
    a means for maintaining the compressed state of said anisotropic connection material in a compression direction, and for isolating said anisotropic connection material from the outside of the carrier body, wherein said means overlaps said radiofrequency electronic module and said carrier body as viewed in the compression direction and maintains the compressed state of said anisotropic connection material by pressing against the radiofrequency electronic module in the compression direction, at least a portion of the radiofrequency electronic module being located between the carrier body and the means along the compression direction,
    and wherein said means completely covers said radiofrequency electronic module as viewed in the compression direction.

12. A contactless, purely radiofrequency intermediate device with a contactless, purely radiofrequency electronic module, the radiofrequency electronic module being configured to receive at least one sheet or a portion of a sheet or a covering layer on the radiofrequency electronic module, the intermediate device comprising:
    a carrier body, at least one interconnection area of an electrical circuit, carried by the carrier body, the radiofrequency electronic module connected to the at least one interconnection area by an anisotropic connection material, the anisotropic connection material being compressed, in a compression direction, between the at least one interconnection area and the radiofrequency electronic module, and a portion of the radiofrequency electronic module extending into the carrier body between two portions of the at least one interconnection area, and a first layer or sheet covering a first side of the radiofrequency electronic module and a second layer or sheet covering a second side of the radiofrequency electronic module opposite to the first side, the first layer or sheet and the second layer or sheet being fixed to the carrier body, the first and second layers or sheets maintaining the compressed state of the anisotropic connection material and isolating the anisotropic connection material from the outside of the carrier body, wherein the first layer or sheet completely covers said radiofrequency electronic module as viewed in the compression direction.

13. A method for manufacturing a contactless device with a contactless electronic module, said method comprising a step of forming a carrier body comprising:

at least one interconnection area of an electrical circuit, carried by the carrier body; and the contactless electronic module connected to said at least one interconnection area by an anisotropic connection material, said anisotropic connection material being located between said at least one interconnection area and the contactless electronic module in a stacking direction, and a portion of the contactless electronic module extending into the carrier body between two portions of the at least one interconnection area, wherein the method comprises the use of isolation means for isolating said anisotropic connection material from the outside of the carrier body.

14. A contactless device with a contactless electronic module, said contactless device comprising:

a carrier body;

at least one interconnection area of an electrical circuit, carried by the carrier body;

the contactless electronic module connected to said at least one interconnection area by an anisotropic connection material, said anisotropic connection material being located between said at least one interconnection area and the contactless electronic module in a stacking direction, and a portion of the contactless electronic module extending into the carrier body between two portions of the at least one interconnection area; and a means for isolating said anisotropic connection material from the outside of the carrier body.

15. A contactless device with a contactless electronic module, the contactless device comprising:

a carrier body;

at least one interconnection area of an electrical circuit, carried by the carrier body;

the contactless electronic module connected to the at least one interconnection area by an anisotropic connection material, the anisotropic connection material being located between the at least one interconnection area and the contactless electronic module in a stacking direction, and a portion of the contactless electronic module extending into the carrier body between two portions of the at least one interconnection area; and a first layer or sheet covering a first side of the contactless electronic module and a second layer or sheet covering a second side of the contactless electronic module opposite to the first side, the first layer or sheet and the second layer or sheet being fixed to the carrier body, the first and second layers or sheets isolating the anisotropic connection material from the outside of the carrier body.

16. A method for manufacturing a contactless, purely radiofrequency intermediate device with a contactless, purely radiofrequency electronic module, said intermediate device being configured to receive at least one covering sheet or portion of sheet or layer, said method comprising a step of forming a carrier body comprising:

at least one interconnection area of an electrical circuit, carried by the carrier body; and the radiofrequency electronic module connected to said at least one interconnection area by an anisotropic connection material, said anisotropic connection material being compressed between said at least one interconnection area and the radiofrequency electronic module, and a portion of the radiofrequency electronic module extending into the carrier body between two portions of the at least one interconnection area, wherein the method comprises the use of maintenance means for maintaining the compressed state of said anisotropic connection material in a compression direction, wherein said maintenance means overlaps said radiofrequency electronic module and said carrier body as viewed in the compression direction and maintains the compressed state of said anisotropic connection material by pressing against the radiofrequency electronic module in the compression direction, at least a portion of the radiofrequency electronic module being located between the carrier body and the maintenance means along the compression direction.

17. A contactless, purely radiofrequency intermediate device with a contactless, purely radiofrequency electronic module, said radiofrequency electronic module being configured to receive at least one sheet or a portion of a sheet or a covering layer on the radiofrequency electronic module, said intermediate device comprising:

a carrier body;

at least one interconnection area of an electrical circuit, carried by the carrier body;

the radiofrequency electronic module connected to said at least one interconnection area by an anisotropic connection material, said anisotropic connection material being compressed between said at least one interconnection area and the radiofrequency electronic module, and a portion of the radiofrequency electronic module extending into the carrier body between two portions of the at least one interconnection area; and a means for maintaining the compressed state of said anisotropic connection material in a compression direction, wherein said means overlaps said radiofrequency electronic module and said carrier body as viewed in the compression direction and maintains the compressed state of said anisotropic connection material by pressing against the radiofrequency electronic module in the compression direction, at least a portion of the radiofrequency electronic module being located between the carrier body and the means along the compression direction.

18. A contactless, purely radiofrequency intermediate device with a contactless, purely radiofrequency electronic module, the radiofrequency electronic module being configured to receive at least one sheet or a portion of a sheet or a covering layer on the radiofrequency electronic module, the intermediate device comprising:
- a carrier body;
- at least one interconnection area of an electrical circuit, carried by the carrier body;
- the radiofrequency electronic module connected to the at least one interconnection area by an anisotropic connection material, the anisotropic connection material being compressed between the at least one interconnection area and the radiofrequency electronic module, and a portion of the electronic module extending into the carrier body between two portions of the at least one interconnection area; and
- a first layer or sheet covering a first side of the radiofrequency electronic module and a second layer or sheet covering a second side of the radiofrequency electronic module opposite to the first side, the first layer or sheet and the second layer or sheet being fixed to the carrier body, the first and second layers or sheets maintaining the compressed state of the anisotropic connection material.

19. A method for manufacturing a contactless, purely radiofrequency intermediate device with a contactless, purely radiofrequency electronic module, said intermediate device being configured to receive at least one covering sheet or portion of sheet or layer, said method comprising a step of forming a carrier body comprising:
- at least one interconnection area of an electrical circuit, carried by the carrier body, the electrical circuit comprising an antenna which includes conductive wire embedded within the carrier body; and
- the radiofrequency electronic module connected to said at least one interconnection area by an anisotropic connection material, said anisotropic connection material being compressed between said at least one interconnection area and the radiofrequency electronic module,
- wherein the method comprises the use of maintenance/isolation means for maintaining the compressed state of said anisotropic connection material in a compression direction, and for isolating said anisotropic connection material from the outside of the carrier body,
- wherein said maintenance/isolation means overlaps said radiofrequency electronic module and said carrier body as viewed in the compression direction and maintains the compressed state of said anisotropic connection material by pressing against the radiofrequency electronic module in the compression direction, at least a portion of the radiofrequency electronic module being located between the carrier body and the maintenance/isolation means along the compression direction,
- and wherein said maintenance/isolation means completely covers said radiofrequency electronic module as viewed in the compression direction.

20. A contactless, purely radiofrequency intermediate device with a contactless, purely radiofrequency electronic module, said radiofrequency electronic module being configured to receive at least one sheet or a portion of a sheet or a covering layer on the radiofrequency electronic module, said intermediate device comprising:
- a carrier body,
- at least one interconnection area of an electrical circuit, carried by the carrier body, the electrical circuit comprising an antenna which includes conductive wire embedded within the carrier body,
- the radiofrequency electronic module connected to said at least one interconnection area by an anisotropic connection material, said anisotropic connection material being compressed between said at least one interconnection area and the radiofrequency electronic module, and
- a means for maintaining the compressed state of said anisotropic connection material in a compression direction, and for isolating said anisotropic connection material from the outside of the carrier body, wherein said means overlaps said radiofrequency electronic module and said carrier body as viewed in the compression direction and maintains the compressed state of said anisotropic connection material by pressing against the radiofrequency electronic module in the compression direction, at least a portion of the radiofrequency electronic module being located between the carrier body and the means along the compression direction,
- and wherein said means completely covers said radiofrequency electronic module as viewed in the compression direction.

* * * * *